United States Patent [19]

Lord et al.

[11] 4,169,280

[45] Sep. 25, 1979

[54] METHOD FOR MAKING GLASS NONFOGGING

[75] Inventors: David E. Lord; Gary W. Carter; Richard R. Petrini, all of Livermore, Calif.

[73] Assignee: The United States of America as represented by the United States Department of Energy, Washington, D.C.

[21] Appl. No.: 924,337

[22] Filed: Jul. 13, 1978

[51] Int. Cl.$^2$ .............................................. H01G 7/02
[52] U.S. Cl. .................................. 361/225; 361/233; 307/400; 361/320
[58] Field of Search ...................... 361/225, 233, 320; 264/22; 307/88 ET

[56] References Cited

U.S. PATENT DOCUMENTS

| | | | |
|---|---|---|---|
| 2,538,554 | 1/1951 | Cherry, Jr. | 361/233 |
| 3,365,633 | 1/1968 | Anderson | 361/233 |

OTHER PUBLICATIONS

Gutmann, F; "The Electret," Reviews of Modern Physics, vol. 20, No. 3, pp. 457-472.

Primary Examiner—J. D. Miller
Assistant Examiner—L. Shroeder
Attorney, Agent, or Firm—Dean E. Carlson; R. S. Gaither; L. E. Carnahan

[57] ABSTRACT

A method for rendering glass nonfogging (to condensation fog) by sandwiching the glass between two electrodes such that the glass functions as the dielectric of a capacitor, a large alternating current (AC) voltage is applied across the electrodes for a selected time period causing the glass to absorb a charge, and the electrodes are removed. The glass absorbs a charge from the electrodes rendering it nonfogging. The glass surface is undamaged by application of the AC voltage, and normal optical properties are unaffected. This method can be applied to optical surfaces such as lenses, auto windshields, mirrors, etc., wherever condensation fog on glass is a problem.

3 Claims, No Drawings

METHOD FOR MAKING GLASS NONFOGGING

BACKGROUND OF THE INVENTION

The invention described herein was made at the Lawrence Livermore Laboratory in the course of, or under, Contract No. W-7405-ENG-48 between the University of California and the United States Department of Energy.

The invention relates to the treating of glass, and more particularly to a method for rendering glass nonfogging to condensation fog.

Various methods are known in the art for preventing fogging of glass utilized in lenses, windows, windshields, eyeglasses, goggles, etc., wherein the fogging is caused by water/ice or condensed water vapor of the ambient atmosphere.

One prior method for preventing fogging of glass is the application of electrical current through the glass causing warming of same. Such prior efforts are exemplified by U.S. Pat. Nos. 3,495,259 issued Feb. 10, 1970 to Martin-Gottfried Rockoll et al and 3,624,347 issued Nov. 30, 1971 to H. E. Todd et al.

Another prior method for protecting glass from becoming fogged is to provide a coating on the glass such as a hydrophilic polymeric salt, as exemplified by U.S. Pat. No. 3,779,792 issued Dec. 18, 1973 to A. Stoy et al, or a hydrophilic film-forming resin, as exemplified by U.S. Pat. No. 3,865,619 issued Feb. 11, 1975 to H. Pennewiss et al.

While the prior approaches for protecting optical surfaces from becoming fogged by water or ice from condensed water vapor of the ambient atmosphere have been effective, such approaches are expensive and are subject to being rendered ineffective by damage to the coating or by discontinuance of the electrical current therethrough. Thus, a need has existed in the art for a simple, inexpensive method for rendering such optical surfaces nonfogging.

SUMMARY OF THE INVENTION

The present invention provides a simple, inexpensive, and effective method for rendering glass surfaces nonfogging to condensation fog. The method involves sandwiching the glass between conductive electrodes, such that the glass functions as the dielectric of a capacitor, applying an AC voltage of several ($\frac{1}{2}$ to 10) kilovolts at about 1000 Hz and with a current rating of about 100–150 milliamperes across the electrodes for time intervals up to several (1/10 to 10) minutes causing the glass to absorb a charge, and removing the electrodes from the glass. The glass surface is undamaged by application of the AC voltage, and the normal optical properties are unaffected. The method can be applied to optical elements such as lenses, windows, eyeglasses, mirrors, auto windshields, etc.

Therefore, it is an object of the invention to provide a method for protecting glass from becoming fogged by water or condensed water vapor of the ambient atmosphere.

A further object of the invention is to provide a method for rendering glass nonfogging to condensation fog.

Another object of the invention is to provide a method for rendering glass nonfogging by applying a large AC voltage across the glass for a period of time.

Another object of the invention is to provide a method for rendering glass nonfogging to condensation fog by sandwiching the glass between electrodes, directing a large AC voltage through the glass for a selected time period, and removing the glass from between the electrodes.

Other objects of the invention will become readily apparent to those skilled in the art from the following description.

DETAILED DESCRIPTION OF THE INVENTION

The invention involves a method for rendering glass, such as that used in photographic lenses, optical equipment, vehicle windshields, eyeglasses, etc., nonfogging to condensation fog. Basically, electrical charges at and beneath the surface of the glass are permanently or semipermanently embedded into the glass by the method which involves directing a large AC voltage through the glass for a selected time period, which renders the glass nonfogging.

The method is very simple in which the glass to be treated becomes the dielectric of a capacitor. The capacitor is formed by two metallic electrodes and the dielectric. An AC voltage of several kilovolts depending on the thickness of the glass at about 1 KHz and 100 or so milliamperes rating is applied across the electrodes for times up to several minutes (1/10 to 10). The electrodes are removed and the glass has absorbed the charge which renders the glass nonfogging to condensation fog.

Tests on the glass treated in accordance with the invention have revealed that conventional cleaning techniques could not remove the embedded charge from the glass. It was also found that conductive solutions such as acid/neutralizer combinations only temporarily remove the surface charge. Apparently, the more deeply embedded charge migrated to the surface to replenish the removed charge. Tests on glass treated by the nonfogging method over a two-year period have shown that is still retains this property. The thus treated glass has been tested in steam/water conditions without adverse effect on the non-fogging property of the glass. Also, the thus treated glass has been examined for structural damage (electron microscopy) and optical damage, with no significant damage found.

By way of example, photographic lenses were treated by the method of invention wherein glass having a thickness of 1/32" and diameter of 1/16" was placed between two electrodes, such as aluminum foil or sheet, such that the glass functioned as a dielectric of a capacitor. An alternating current (AC) voltage of one kilovolt at 1000 Hz, and a current rating of up to 150 milliamperes, was applied across the electrodes for a time interval of several minutes. After which the glass was removed from between the electrodes leaving a permanently embedded electrical charge at and beneath the surface thereof. Small objects such as lenses were treated in a chamber where pressure and atmosphere could be controlled.

More specifically, a piece of glass having a thickness of 1/16" was placed between two aluminum electrodes, with the AC voltage applied thereacross being of 1.5 kilovolts at 1000 Hz and a current rating of 150 milliamperes, for a time period of $\frac{1}{2}$ minute. This was accomplished at normal atmosphere pressure in air.

Large objects having a glass thickness of up to $\frac{1}{4}$ inch, such as automobile windshields, can be treated in air at atmospheric pressure using conformable electrodes such as thin aluminum sheet (foil).

Such charge can be also embedded by electron machines, but which require vacuum conditions and more extensive machinery.

It has thus been shown that the present invention provides an effective method for rendering glass nonfogging without affecting its normal optical properties, thus greatly advancing the state of this art.

While particular procedures and parameters have been described, modifications will become apparent to those skilled in the art, and it is intended to cover in the appended claims all such modifications as come within the spirit and scope of the invention.

What we claim is:

1. A method for rendering glass nonfogging to condensation type fog, comprising the steps of: postioning the glass having a thickness of 1/32" to 1/8 " between a pair of electrodes such that the glass functions as a dielectric of a capacitor; applying across the electrodes an AC voltage in the range of ½ to 10 kilovolts at about 1000 Hz and with a current rating in the range of up to 150 milliamperes; maintaining the voltage across the electrodes for a time period in the range of 1/10 to 10 minutes wherein the glass absorbs an electric charge; and removing the glass from between the electrodes, thereby rendering the glass nonfogging.

2. The method defined in claim 1, additionally including the step of forming the pair of electrodes from thin aluminum sheet (foil) and other conformable conductive material for treating large curved objects.

3. The method defined in claim 1, wherein said glass has a thickness of about 1/16", wherein said voltage is 1.5 kilovolts at about 1000 Hz with a current rating of about 100 milliamperes, and wherein said time period is ½ minute.

* * * * *